(12) United States Patent
Klein-Reesink

(10) Patent No.: US 6,542,003 B2
(45) Date of Patent: Apr. 1, 2003

(54) CIRCUIT CONFIGURATION AND METHOD FOR DIRECTLY ELECTRICALLY ISOLATED BROADBAND TRANSMISSION

(75) Inventor: Ludger Klein-Reesink, Vreden (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/027,111

(22) Filed: Dec. 26, 2001

(65) Prior Publication Data

US 2002/0122496 A1 Sep. 5, 2002

Related U.S. Application Data

(63) Continuation of application No. PCT/DE00/02068, filed on Jun. 26, 2000.

(30) Foreign Application Priority Data

Jun. 25, 1999 (DE) .......................... 199 29 231

(51) Int. Cl.⁷ .................... H03K 19/0175; H03K 17/16
(52) U.S. Cl. .......................................... 326/83; 326/22
(58) Field of Search ............................. 326/83, 86, 82, 326/21, 22, 31

(56) References Cited

U.S. PATENT DOCUMENTS 6,008,681 A * 12/1999 Beutler et al. .............. 327/304
6,212,586 B1 * 4/2001 Mros et al. ................. 710/302
6,426,646 B2 * 7/2002 Yoshizawa et al. ........... 326/30

FOREIGN PATENT DOCUMENTS

DE 196 10 248 A1 9/1997
JP 59 101 949 6/1984

OTHER PUBLICATIONS

Ward, R.: "Avoiding the Pitfalls in Serial Digital Signal Disribution", SMPTE Journal, No. 1, 1993, pp. 14–23.

Horowitz, P.: "Digital Meets Analog", Cambridge University Press, 1997.

* cited by examiner

Primary Examiner—Michael Tokar
Assistant Examiner—James H. Cho
(74) Attorney, Agent, or Firm—Laurence A. Greenberg; Werner H. Stemer; Ralph E. Locher

(57) ABSTRACT

In order to enable a simple and cost-effective directly electrically isolated transmission of data signals, the data signals are superposed on a clock signal in an input stage and are transmitted to an output stage in a directly electrically isolated manner via a decoupling device. The clock signal on which the transmitted signals are superposed is filtered out in the output stage. Pulse shape alterations occurring in the signals because of the transmission or because of the filtering-out of the clock signal are compensated in the output stage so that filtered data signals are present at the output of the circuit configuration.

19 Claims, 1 Drawing Sheet

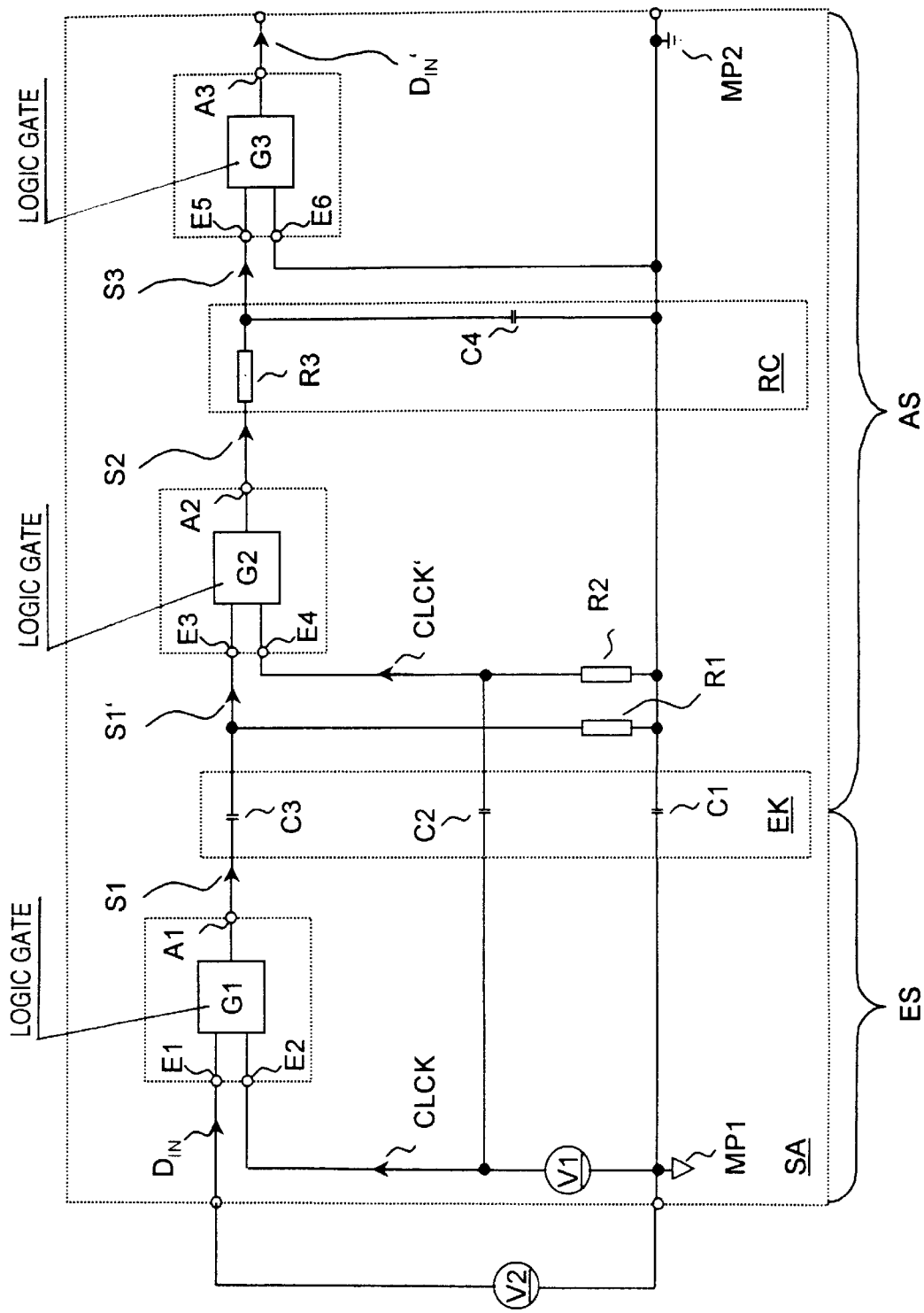

CIRCUIT CONFIGURATION AND METHOD FOR DIRECTLY ELECTRICALLY ISOLATED BROADBAND TRANSMISSION

CROSS-REFERENCE TO RELATED APPLICATION

This application is a continuation of copending International Application No. PCT/DE00/02068, filed Jun. 26, 2000, which designated the United States.

BACKGROUND OF THE INVENTION

Field of the Invention

The invention relates to a configuration for the direct electrical isolation of systems with broadband transmission, and to a method for the direct electrical isolation of systems with broadband transmission.

Since there is an unceasing rise in the required speed of data transmission in the age of merging information and communication networks, interference-free transmission of data presents a challenge for the developers active in this field, since the susceptibility of the transmitted data to interference also increases with the speed.

One source of errors in data transmission is the direct electrical interfering influence caused by common current paths, which becomes apparent through voltage drops relative to the common ground connection that are superposed on the data signals. These voltage drops are caused by contact resistances at connections or plug connections.

One possibility for avoiding the direct electrical interfering influencing is to use direct electrical decoupling. The decoupling is effected by avoiding common reference conductors and by providing potential isolation of the electric circuits and is realized by using optocouplers in data transmission.

High-speed optocouplers are required for fast data transmission, as is customary nowadays in computer technology, for example, in the case of a "universal serial bus" USB.

One disadvantage of high-speed optocouplers is the high purchase price. Many competing companies are simultaneously active in this field, and the level of production costs and hence of the purchase costs are therefore crucial for selection by the purchaser and for the success of the companies.

A further disadvantage of the optocouplers is the relatively long temperature- and voltage-dependent signal propagation times. These propagation times cause difficulties primarily in transmitting a plurality of data signals in parallel, since the individual propagation times of the optocouplers may, in the extreme case, differ to such an extent that the transmitted data signals are no longer synchronous.

Published German Patent Application DE 196 10 248 A1 discloses a method and a circuit configuration for directly electrically isolating a signal path, in which at least one signal input and at least one signal output assigned to this signal input have a direct electrical isolation between the input and output. A circuit configuration is provided for the direct electrical isolation of the signal path.

Summary of the Invention

It is accordingly an object of the invention to provide a simple, cost-effective circuit configuration and a method for performing a directly electrically isolated broadband transmission which overcome the above-mentioned disadvantages of the prior art apparatus and methods of this general type.

With the foregoing and other objects in view there is provided, in accordance with the invention, a circuit configuration for performing directly electrically isolated broadband transmission. The circuit configuration has an input stage including at least one logic signal combination device, a first line for transmitting a clock signal, a second line for transmitting a data signal, and a connection to a first ground potential. The circuit configuration also has an output stage including at least one second logic signal combination device, a filter connected downstream of the second logic signal combination device, and a connection to a second ground potential. The circuit configuration also has a decoupling device.

The first logic signal combination device has a first signal input that receives the data signal and a second signal input that receives the clock signal. The first logic signal combination device includes a first signal output outputting a first output signal to the decoupling device. The first output signal consists of the data signal superposed on the clock signal. The decoupling device decouples the input stage from the output stage by generating a decoupled clock signal from the clock signal and by generating a decoupled first output signal from the first output signal. The second logic signal combination device includes a third signal input that receives the decoupled first output signal from the decoupling device. The second logic signal combination device includes a fourth signal input that receives the decoupled clock signal from the decoupling device. The second logic signal combination device includes a second signal output outputting a second output signal consisting of a decoupled data signal that is separated from the decoupled clock signal. The second signal output always outputs defined and/or stable signals. The filter is configured to filter out interference pulses contained in the second output signal to generate a third output signal that is a filtered decoupled data signal. The decoupling device decouples the input stage from the output stage such that the first ground potential is directly electrically isolated from the second ground potential and such that the clock signal and the first output signal are transmitted in a directly electrically isolated manner from the input stage to the output stage.

The number of first logic signal combination devices is determined by the number of data signals in such a way that each data signal is associated with a first logic signal combination device. The number of second logic signal combination devices and filters is determined by the number of data signals such that each data signal is associated with a second logic signal combination device and a filter connected downstream of the respective second logic signal combination device. The first logic signal combination device has a first signal input, at which a data signal is present, and a second signal input, at which the clock signal is present, and is configured in such a way that a first output signal is output as a data signal superposed on the clock signal at a first signal output.

The second logic signal combination device has a third signal input, at which a decoupled first output signal is present, and a fourth signal input, at which a decoupled clock signal is present. The second logic signal combination device is configured such that a second output signal is output as a decoupled data signal that is freed from the decoupled clock signal at a second signal output. In each case, a filter is connected downstream of the second logic signal combination device, which filter filters out interference pulses contained in the second output signal so that a third output signal is generated as a decoupled data signal freed from interference pulses.

The input stage and the output stage are decoupled such that the first ground potential is directly electrically isolated from the second ground potential and the clock signal and the respective first output signal are transmitted in a directly electrically isolated manner.

The essential advantage of circuit configuration for performing directly electrically isolated broadband transmission is the short signal propagation times which, moreover, can be calculated since they essentially depend on the logic signal combination device used and also on the frequency of the clock signal. Low costs are also achieved, since standard mass produced components are used which can be procured at favorable prices. Since the propagation times can be calculated, this circuit configuration can be used, in particular, for implementing parallel data transmission.

In accordance with an added feature of the invention, the output stage includes at least one third logic signal combination device connected downstream from the filter. The third logic signal combination device has a fifth signal input receiving the third output signal and a sixth signal input receiving the second ground potential. The third logic signal combination device is configured such that pulses of the third output signal are converted back into a rectangular form for generating a recovered data signal. The third logic signal combination device has a third signal output that outputs the recovered data signal. Any deviations from the rectangular form generally exhibited by data and clock pulses that are caused by the filter are reversed, thereby also enabling, a more reliable detection of the data signals.

In accordance with additional feature of the invention, the first and second logic signal combination devices are each an XOR gate or an XNOR gate. Cost-effective purchase of the logic combination elements used allow a particularly simple and space-saving configuration for realizing the superposition of the clock signal by the data signal, since there are generally a plurality of logic combination elements in an integrated circuit.

In accordance with another feature of the invention, the third logic signal combination device is an XOR gate. This development is distinguished by low purchase costs, and moreover, obviates a negation element if the first and second logic signal combination devices are likewise XOR gates.

In accordance with a further feature of the invention, the third logic signal combination device is an XNOR gate. This development is distinguished by low purchase costs, and moreover, obviates a negation element if the first and second logic signal combination devices are likewise XNOR gates.

In accordance with a further added feature of the invention, the decoupling device includes: at least one first inductive transformer having a primary winding connected to the first ground potential and a secondary winding connected to the second ground potential. The primary winding is connected downstream from the first signal output and the secondary winding is connected upstream from third signal input. The decoupling device also includes at least one second inductive transformer having a primary winding connected to the first line and the first ground potential, and a secondary winding connected to the fourth signal input and the second ground potential.

In accordance with a further additional feature of the invention, the decoupling device includes: at least one first capacitor connected between the first signal output and the third signal input; a second capacitor connected between the first line and the second signal input; and a third capacitor connected between the first ground potential and the second ground potential. An essential advantage of this feature is cost-effectiveness, since capacitors, in particular the capacitors required for the decoupling, are mass-produced products. In addition, a minimal number of lines are required, since only the signal to be decoupled, for direct electrical isolation, has to be connected to a first connection of the capacitor. The decoupled signal can be tapped off at a second connection of the capacitor.

In accordance with yet an added feature of the invention, the circuit configuration includes: at least one first resistor connected between the second signal input and the second ground potential; and at least one second resistor connected between the third signal input and the second ground potential. This feature ensures that stable potentials relative to the second ground potential are provided at the signal inputs of the second logic signal combination device, so that even in the event of absent input signals and/or unstable input signals, a defined and/or stable output signal is always generated at the signal output of the logic signal combination device.

In accordance with yet an additional feature of the invention, the filter includes: at least one third resistor connected downstream from the second signal output; and at least one fourth capacitor connected between the third resistor and the second ground potential. The fourth capacitor has a terminal at which the third output signal is present. This feature provides a simple and cost-effective configuration for removing interference pulses that are present.

In accordance with yet an added feature of the invention, the input stage includes a generator for generating the clock signal; and the generator is connected between the first ground potential and the first line. This advantageous feature means that it is no longer necessary to supply the circuit configuration with an external clock signal. As a result, a connection and also an external line for feeding in the external clock signal are obviated. The tolerance and quality factor of the clock signal are known—in contrast to the external clock signal—so that the circuit configuration can be optimally coordinated therewith.

With the foregoing and other objects in view there is also provided, in accordance with the invention, a method for performing directly electrically isolated broadband transmission. The method includes steps of: in an input stage, superimposing a data signal on a clock signal to obtain a first output signal by logically combining the data signal and the clock signal; transmitting the first output signal and the clock signal in a directly electrically isolated manner to an output stage; directly electrically isolating a first ground potential of the input stage from a second ground potential of the output stage; in the output stage, logically combining the first output signal that has been transmitted and the clock signal that has been transmitted to thereby form a second output signal that is a decoupled data signal which is is transmitted in a directly electrically isolated manner and which is separated from a decoupled clock signal; and filtering the second output signal to remove interference pulses contained in the second output signal and to thereby generate a filtered data signal defining a third output signal.

In other words, the data signal is logically combined with a high-frequency clock signal in an input stage to form a first output signal. To that end, the respective data signal is superposed on the high-frequency clock signal.

The respective first output signal and also the clock signal are transmitted in a directly electrically isolated manner to an output stage, and a first ground potential of the input stage is directly electrically isolated from a second ground potential of the output stage.

A first output signal, which is transmitted in a directly electrically isolated manner, and a clock signal, which is transmitted in a directly electrically isolated manner, are logically combined in the output stage to form a second output signal. To that end, the first output signal, which is transmitted in a directly electrically isolated manner, is separated from the clock signal, which is transmitted in a directly electrically isolated manner.

Finally, interference pulses that are present in the second output signal are filtered, so that a third output signal is generated as a filtered data signal.

The method enables a cost-effective and simple realization of a directly electrically isolated transmission of signals.

In accordance with an added mode of the invention, the method includes converting pulses of the third output signal back into a rectangular form to convert the third output signal into a recovered data signal. The advantage provided by this mode is the correction of deviations of the data and clock pulses from the rectangular pulse shape generally exhibited by data and clock signals.

In accordance with a concomitant mode of the invention, the method includes inductively performing the step of transmitting the first output signal and the clock signal; and inductively performing the step of directly electrically isolating the first ground potential from the second ground potential. This mode enables a cost-effective implementation of the direct electrical isolation.

Other features which are considered as characteristic for the invention are set forth in the appended claims.

Although the invention is illustrated and described herein as embodied in a circuit configuration and method for directly electrically isolated broadband transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The sole drawing figure shows a circuit configuration for performing directly electrically isolated transmission of a data signal.

DESCRIPTION OF THE PREFERRED EMBODIMENTS

Referring now to the sole drawing FIGURE, there is shown a circuit configuration SA, which can be subdivided into an input stage ES and an output stage AS. The input stage ES and the output stage AS are directly electrically isolated by a decoupling device EK. Because of this direct electrical isolation, the input stage has a first ground potential MP1 and the output stage AS has a directly electrically isolated second ground potential MP2.

The circuit configuration SA enables a data signal $D_{IN}$ to be transmitted in a directly electrically isolated manner. The data signal $D_{IN}$ is generated by an external signal source V2 with respect to the circuit configuration. To that end, the data signal $D_{IN}$ is fed into the input stage ES, where it is logically combined with a high-frequency clock signal CLCK by an EXCLUSIVE-OR gate (XOR gate) G1 so that a first output signal S1 is output at a first signal output A1 of the gate G1. The output signal corresponds to a data signal superposed on the high-frequency clock signal; i.e. the data signal $D_{IN}$ is modulated with the high-frequency clock signal CLCK, and the clock signal CLCK adopts the role of the carrier frequency as known from the signal theory.

The high-frequency clock signal CLCK is generated by a generator V1 that is part of the input stage ES (internal signal source). As an alternative, the input stage may also be configured such that the clock signal CLCK is generated by an external signal source and is fed to the input stage ES.

The decoupling device EK illustrated in the drawing is composed of three capacitors C1, C2 and C3. The capacitor C1 directly electrically isolates the first ground potential MP1 from the second ground potential MP2. The capacitor C2 directly electrically isolates the clock signal CLCK from the output stage AS. The capacitor C3 directly electrically isolates the first output signal S1 from the output stage AS. The respective capacitor C1, C2 or C3 is connected between the sides to be isolated. This ensures that the clock signal CLCK and the first output signal S1 are transmitted in a directly electrically isolated manner to the output stage AS.

The capacitors used are, for example, ceramic capacitors, which are particularly suitable because of their ability to withstand high voltages.

As an alternative, for directly electrically isolating the input stage ES and the output stage AS, it is possible to use inductive transformers, for example, LAN transformers that are particularly suitable for high-speed transmission. The first ground potential MP1 and the first output signal Si would be connected to the primary of a first transformer, and a third signal input E3 and the second ground potential MP2 would be connected to the secondary of the first transformer. The first ground potential MP1 and the clock signal CLCK would be connected to the primary of a second transformer, and a fourth signal input E4 and the second ground potential MP2 would be connected to the secondary side.

The first and second transformers would directly electrically isolate the first ground potential MS1 from the second ground potential MS2, would directly electrically isolate the clock signal CLCK and the first output signal S1 from the output stage AS, and would thereby realize directly electrically isolated transmission of the clock signal CLCK and also of the first output signal from output stage AS.

The output stage has a second XOR gate G2 with a signal input E3 (third signal input) to which the first output signal Si' is transmitted in a directly electrically isolated manner. The XOR gate G2 has a signal input E4 (fourth signal input) to which the clock signal CLCK' is transmitted in a directly electrically isolated manner. The second XOR gate G2 generates a second output signal S2 at a second signal output A2 by logically combining the first output signal Si' and the clock signal CLCK' which have been transmitted in a directly electrically isolated manner. The first output signal S1 is a superposition of the clock signal CLCK with the data signal $D_{IN}$. Using the clock signal CLCK that has been transmitted in a directly electrically isolated manner, the data signal $D_{IN}$ can be separated from the clock signal CLCK', and a second output signal S2 can thereby be generated which forms a data signal that is transmitted in a directly electrically isolated manner.

Moreover, the second XOR gate G2 ensures that the signals of the input stage ES and of the output stage AS are synchronized and also compensates for any deviations from a rectangular pulse shape that is generally exhibited by the signals, since XOR gates generate output signals with a rectangular pulse shape.

To ensure that a stable output signal S2 is always output at the second signal output A2, irrespective of whether or not input signals are present, a first resistor R1 is connected between the third signal input E3 and the second ground potential MP2, and a second resistor R2 is connected between the fourth signal input E4 and the second ground potential MP2. These pull-down resistors provide for a defined potential at the signal inputs E3 and E4 and thus also at the second signal output A2.

Omitting the pull-down resistors or using alternative circuitry configurations that provide for a stable output signal are likewise conceivable.

The second output signal S2 is fed to a filter RC, which is likewise part of the output stage AS, in order to filter the second output signal S2. A component, which represents the data signal that is transmitted in a directly electrically isolated manner, is filtered out from possible interference pulses which are contained in the second output signal S2 and are caused by possible different switching thresholds at the third signal input E3 and the fourth signal input E4.

The filter RC represents a low-pass filter constructed from a known interconnection of a third resistor R3 and a fourth capacitor C4. The resistance and also the capacitance of the capacitor are dimensioned such that the interference pulses that are at a comparatively high frequency with respect to the isolated data signal are filtered out from the second output signal, so that a third output signal S3 is present between the third resistor R3 and the fourth capacitor C4.

As an alternative to realizing the filter RC as a low-pass filter with a resistor and a capacitor, a suitable interconnection of resistance and a coil or a suitable integrated filter module can also realize the same effect.

Since the filtering may generally give rise to deviations from the rectangular pulse shape of the signals, a third XOR gate G3 is connected downstream from the second XOR gate G2 and outputs a recovered data signal $D_{IN}'$ at a third signal output A3.

To that end, the third XOR gate is connected downstream of the filter RC such that the third output signal S3 is applied to a fifth signal input E5 and the second ground potential MP2 is applied to a sixth signal input E6 of the third XOR gate G3.

The third XOR gate G3, as shown, is part of the output stage AS. However, it is also possible to move the third XOR gate G3 into an external circuitry configuration that is connected to output stage AS; i.e. to realize the output stage even without the third XOR gate G3.

As an alternative to the XOR gates G1 to G3, it is also possible to use other logic gates, for example, XNOR gates, or other circuitry configurations that have the same properties.

The circuit configuration SA is especially suitable for transmitting a plurality of data signals in parallel in a directly electrically isolated manner. However, in order to provide a clear representation of the circuit configuration SA, only the special case of transmitting one data signal in a directly electrically isolated manner is represented since, for every further data signal, individual elements of the circuit configuration SA must be multiply present. The required number of individual elements, which depend on the number n of data signals, is shown in the table below:

TABLE 1

| Elmnt. | V2 | G1 | MP1 | EK (C1;C2;C3) | R1 | R2 | G2 | RC (R3;C4) | G3 | MP2 |
|---|---|---|---|---|---|---|---|---|---|---|
| Number | n | n | 1 | 1 (1;1;n) | n | n | n | n (n;n) | n | 1 |

Table 1 reveals that n+2 capacitors C1 ... Cn+2 (decoupling elements) are required for realizing the decoupling device EK, whereas only n+1 inductive transformers (decoupling elements) are required for realizing the decoupling device EK with inductive transformers. This is because the first ground potential MP1 and the second ground potential MP2 are already directly electrically isolated from one another by the connection—required for the inductive transmission—to the inductive transformers, whereas when the decoupling device EK is realized by capacitors for a capacitive transmission, only the signal that is to be transmitted in a directly electrically isolated manner is connected to a capacitor C2, C3, ..., Cn+2, so that an additional capacitor C1 is required for directly electrically isolating the first ground potential MP1 and the second ground potential MP2.

I claim:

1. A circuit configuration for performing directly electrically isolated broadband transmission, comprising:
    an input stage including at least one first logic signal combination device, a first line for transmitting a clock signal, a second line for transmitting a data signal, and a connection to a first ground potential;
    an output stage including at least one second logic signal combination device, a filter connected downstream of said second logic signal combination device, and a connection to a second ground potential; and
    a decoupling device;
    said first logic signal combination device having a first signal input receiving the data signal, and a second signal input receiving the clock signal;
    said first logic signal combination device including a first signal output outputting a first output signal to said decoupling device, the first output signal consisting of the data signal superposed on the clock signal;
    said decoupling device decoupling said input stage from said output stage by generating a decoupled clock signal from the clock signal and by generating a decoupled first output signal from the first output signal;
    said second logic signal combination device including a third signal input receiving the decoupled first output signal from said decoupling device;
    said second logic signal combination device including a fourth signal input receiving the decoupled clock signal from said decoupling device;
    said second logic signal combination device including a second signal output outputting a second output signal consisting of decoupled data signal that is separated from the decoupled clock signal;
    said second signal output always outputting defined signals;
    said filter configured for filtering out interference pulses contained in the second output signal to generate a third output signal that is a filtered decoupled data signal; and
    said decoupling device decoupling said input stage from said output stage such that the first ground potential is directly electrically isolated from the second ground potential and such that the clock signal and the first output signal are transmitted in a directly electrically isolated manner from said input stage to said output stage.

2. The circuit configuration according to claim 1, wherein:

said output stage includes at least one third logic signal combination device connected downstream from said filter;

said third logic signal combination device has a fifth signal input receiving the third output signal and a sixth signal input receiving the second ground potential;

said third logic signal combination device is configured such that pulses of the third output signal are converted back into a rectangular form for generating a recovered data signal; and said third logic signal combination device has a third signal output that outputs the recovered data signal.

3. The circuit configuration according to claim 2, wherein said third logic signal combination device is an XOR gate.

4. The circuit configuration according to claim 2, wherein said third logic signal combination device is an XNOR gate.

5. The circuit configuration according to claim 1, wherein:

said first logic signal combination device is an XOR gate; and said second logic signal combination device is an XOR gate.

6. The circuit configuration according to claim 5, wherein said third logic signal combination device is an XOR gate.

7. The circuit configuration according to claim 1, wherein:

said first logic signal combination device is an XNOR gate; and said second logic signal combination device is an XNOR gate.

8. The circuit configuration according to claim 7, wherein said third logic signal combination device is an XNOR gate.

9. The circuit configuration according to claim 1, wherein said decoupling device includes:

at least one first inductive transformer having a primary winding connected to the first ground potential and a secondary winding connected to the second ground potential, said primary winding connected downstream from said first signal output and said secondary winding connected upstream from said third signal input; and at least one second inductive transformer having a primary winding connected to said first line and the first ground potential and a secondary winding connected to said fourth signal input and the second ground potential.

10. The circuit configuration according to claim 1, wherein said decoupling device includes:

at least one first capacitor connected between said first signal output and said third signal input;

a second capacitor connected between said first line and said second signal input; and a third capacitor connected between the first ground potential and the second ground potential.

11. The circuit configuration according to claim 1, comprising:

at least one first resistor connected between said second signal input and the second ground potential; and at least one second resistor connected between said third signal input and the second ground potential.

12. The circuit configuration according to claim 1, wherein said filter includes:

at least one third resistor connected downstream from said second signal output; and at least one fourth capacitor connected between said third resistor and the second ground potential;

said fourth capacitor having a terminal at which the third output signal is present.

13. The circuit configuration according to claim 1, wherein:

said input stage includes a generator for generating the clock signal; and said generator is connected between the first ground potential and said first line.

14. A method for performing directly electrically isolated broadband transmission, which comprises:

in an input stage, superimposing a data signal on a clock signal to obtain a first output signal by logically combining the data signal and the clock signal;

transmitting the first output signal and the clock signal in a directly electrically isolated manner to an output stage;

directly electrically isolating a first ground potential of the input stage from a second ground potential of the output stage;

in the output stage, logically combining the first output signal that has been transmitted and the clock signal that has been transmitted to thereby form a second output signal that is a decoupled data signal which is transmitted in a directly electrically isolated manner and which is separated from a decoupled clock signal; and filtering the second output signal to remove interference pulses contained in the second output signal and to thereby generate a filtered data signal defining a third output signal.

15. The method according to claim 14, which comprises converting pulses of the third output signal back into a rectangular form to convert the third output signal into a recovered data signal.

16. The method according to claim 15, which comprises:

inductively performing the step of transmitting the first output signal and the clock signal; and inductively performing the step of directly electrically isolating the first ground potential from the second ground potential.

17. The method according to claim 15, which comprises:

using an electric field to perform the step of transmitting the first output signal and the clock signal; and using a capacitor to perform the step of directly electrically isolating the first ground potential from the second ground potential.

18. The method according to claim 14, which comprises:

inductively performing the step of transmitting the first output signal and the clock signal; and inductively performing the step of directly electrically isolating the first ground potential from the second ground potential.

19. The method according to claim 14, which comprises:

using an electric field to perform the step of transmitting the first output signal and the clock signal; and using a capacitor to perform the step of directly electrically isolating the first ground potential from the second ground potential.

* * * * *